United States Patent Office 2,699,396
Patented Jan. 11, 1955

2,699,396

MEAT-WRAP PROCESS AND PRODUCT

Carleton S. Francis, Jr., West Harwich, Mass., assignor to Lamitex Products, Inc., New York, N. Y., a corporation of Delaware No Drawing. Application January 4, 1951,
Serial No. 204,480

15 Claims. (Cl. 99—174)

This invention relates to a novel meat and cheese wrap of advantageous properties and, more particularly, it relates to a meat wrap by which animal carcasses, especially skinned beef, veal, and lamb carcasses, can be preserved in the desired condition during storage and shipment. In addition, the present invention relates to a novel method of wrapping uncooked, edible meat by which advantageous results are obtained, and to the novel wrapped meat.

This application is a continuation-in-part of my application Serial Number 52,423, filed October 1, 1948, now abandoned.

The usual treatment of beef, lamb and veal differs somewhat and, because of the nature of the meat, the problems of chilling and storage also differ. In the case of beef, it is customary to eviscerate and skin the carcasses on the killing floor, divide the skinned carcasses into sides, cover each side with a heavy shroud cloth, and transfer the sides to a regular cooler in which a temperature of about 30° F. to 35° F. is maintained. In the cooler, the carcass gradually chills with the elimination of animal heat and reaches the temperature of approximately that of the cooler in a period of about 72 hours. The shroud cloth, having served its useful function of smoothing and bleaching the surface fat is generally removed the day after slaughter. The shroud by that time has become dry and unless promptly removed before the carcass has completely chilled and the fat "set up" will tend to adhere too tightly to the fat surface and cause a tearing of the fat upon removal. Thereafter, the carcass may be held in the cooler for the regular aging or holding period, which may be up to two or three weeks, before the meat is marketed. The meat is then placed in refrigerator cars or refrigerated trucks and shipped to various points, sometimes for great distances. By the time the beef arrives at its destination, the surface fat on the beef is usually yellow and dry. Any exposed meat has darkened and is undesirable from an edible and a sales point of view. Thus considerable meat and fat must be trimmed away by the butcher before it is ready for sale, and such loss constitutes expensive waste. Further, there is a decrease in value due to surface discolorations and marrings caused by the physical rubbing and jostling of the sides or quarters of beef, or prime beef cuts, one against the other, as they hang in the refrigerator cars or trucks during shipment. There is also a decided loss of moisture, ranging from 2% up to 5½%, which has a marked deleterious effect upon the tenderness of the meat. The latter is known to be due to a reduction of the hydrolytic enzymic activity accompanying a loss of water.

Records kept over the past twenty-five years show that America's beef packers have sustained an average loss of 1.8% during cooler storage prior to shipment and another .8% during refrigerator car shipment. Delivery from the terminal coolers of the packer to the retail or wholesale meat dealer occasions another .5% shrink loss and the retailer suffers an additional shrink of 3% to 5% prior to cutting into retail cuts and also a trimming loss due to trimming away desiccated portions of 9% to 15%, depending upon the extent of dehydration.

Veal carcasses, as contrasted with beef, are often chilled with the hide on in order to provide the outside skinned surface with a better appearance and lighter color. No heavy layer of fat is present on veal and, as a consequence, there is no characteristic alteration in the fat surface of the veal such as encountered with beef carcasses. The surface of a skinned calf carcass, whether warm-skinned or cold-skinned, however, rapidly loses the bloom and appearance characteristic of freshly dressed, freshly skinned carcasses, also it drys and the carcass loses weight with the result that the product is graded down and necessarily sold at a lower price. Skinned veal averages a loss of 1% to 2½% between the time of skinning and the time required to transport to market centers. It is desirable, however, that veal be dressed at a packing house but be so preserved that it may be shipped to remote points and arrive in prime condition.

In preparing sheep and lamb for market (the term "lamb" being used hereinafter to include all sheep carcasses regardless of age or sex of the animal), it is the usual practice to remove the pelt from the lamb on or adjacent to the killing floor. The skinned dressed entire carcasses are placed in a cooler or refrigerated room and held at about 34° F. The animal heat is removed in the cooler with an appreciable loss in weight, averaging around 3½% by reason of evaporation of moisture from the surface of the carcass. Lamb, though a succulent, nourishing, desirable meat, has a wooly, oily flavor, decidedly noticeable to many consumers. As in the case of beef and veal, it is of course desirable to ship lamb long distances with the handling incident thereto without surface deterioration.

In the past, several means of wrapping meat have been suggested by which the meat may be supplied with salt brine to discourage mold growth on the meat. Thus, one such suggestion has merely involved wrapping the meat with a brine-soaked cloth, but this method allows excessive evaporation of moisture which causes a rapid and uneven surface chilling, especially from the warm skinned carcasses, does not adequately protect the bloom on veal, and does not materially alter the wooly taste of the fell surface of lamb. Suggestions made to improve this method have included placing the carcass wrapped in a brine soaked cloth in a paper or cloth bag. Unfortunately, the paper bag must be a "breather" and, therefore, cannot be moisture-proof and as it comes in contact with the moist cloth it tends to tear and becomes unattractive in appearance. Furthermore, the air which enters through the interstices of the paper or cloth bag causes the meat to turn dark. It has also been proposed to clothe the carcass with cloth soaked in brine, cover the cloth with oiled paper, and to cover the combination with a second cloth. After cooling, the last applied cloth is removed. Such a method, in addition to being a cumbersome and expensive method of wrapping meat, is not satisfactory because the small amount of air that is entrapped in the free air space between the inner cloth and oiled paper deleteriously affects the wrapped meat. Another suggestion for wrapping meat has involved the use of film such as cellophane, rubber hydrochloride ("Pliofilm"), or polyethylene. The use of such films, however, has not produced satisfactory results since they do not, as does cloth, permit a wicking action which is desirable to provide an even distribution of moisture about the surface of the carcass and to maintain a high moisture content without danger of slime formation. Furthermore, such films do not soak up, evenly distribute, and slowly release the mold-inhibiting and preservative sodium chloride solution. While each of the above-described meat wraps provide some advantages, it will be seen that none of them is wholly satisfactory.

Certain of the above problems are encountered in the treatment and aging of cheeses. In such case it is desirable to have a snug-fitting wrapper which will not entrap air during its application, and which will retard excessive loss of moisture without, however, completely sealing off the cheese from the atmosphere.

It is, therefore, an object of the present invention to provide a meat and cheese wrap which overcomes the various disadvantages of the meat and cheese wraps previously available.

Another object is to provide a covering for meat carcasses which will improve the appearance of the meat, will retain the optimum amount of moisture and juices in the meat during chilling, storage, and shipment, and will improve the tenderness and flavor thereof by encouraging natural hydrolytic enzymic activity in the meat.

Another object of this invention is to provide a meat wrap furnishing optimum insulation to the surface of the warm skinned animal product in order to preserve the delicate light color and bloom comparable only to freshly slaughtered animals that are allowed to chill before skinning.

Still another object of this invention is to provide a covering for meat carcasses that plumps and firms up the irregular contour of the carcass meat during chilling and setting up period and preserves the improvement thus accomplished until the meat is cut into wholesale and retail cuts.

A further object of this invention is to provide a wrap by which the warm freshly skinned carcass is provided with a "skin," which "skin" shrinks during the chilling process to a tight, form-fitting, snug wrapper coat in ultimate contact with the flesh of the irregularly contoured animal carcass.

Another object is to provide a mono-wrap for carcass meats that can be applied to warm, freshly skinned and dressed carcasses as a substitute for the natural skin during the chilling process to obtain brighter colored, more desirable appearing fresh meat.

A further object of the invention is to provide a method for wrapping meat by which the aforesaid advantageous properties may be imparted to meat carcasses.

Other objects, including the provision of wrapped meat of advantageous characteristics, will be apparent from a consideration of this specification and the claims.

Since the wrap of the present invention is particularly applicable to the treatment of meat carcasses, the invention will be particularly described in relation thereto.

The meat and cheese wrap of the present invention is a unitary product comprising an absorbent material and a substantially continuous, moisture-vapor-permeable, pliable, extensile organic film, preferably a synthetic resinous plastic film. In addition, the organic film should be substantially odorless and tasteless and should be water-resistant, that is the physical characteristics of the organic material from which the film is formed should be substantially unaffected by water. The absorbent material which comprises absorbent fibres, for example, cotton, rayon, paper, and the like in the form of woven, knitted, netted, or non-woven fabric such as a felt, web, bat, paper, and the like, is adhered to the organic film to form the unitary product and the required moisture-vapor permeability is provided in the product by minute perforations or "pin holes" in the film. The material referred to above as the "absorbent material" will be sufficiently absorbent, as distinguished from non-absorbent plastic films, cellophane, oiled paper, and the like, to provide wicking action and other characteristics referred to herein. Advantageously, the absorbent material of the product will be capable of retaining at least 30%, and preferably at least 40%, moisture based on the bone dry weight of the product, when the product is soaked in water and when hydroextracted at a peripheral speed of 3,250 feet per minute for two minutes, the hydroextractor having a diameter of 5 inches; and the minute perforations or "pin holes" in the film will provide a moisture-vapor permeability, or moisture-vapor transmission rate, when measured according to the Technical Association of the Pulp and Paper Industry standard method T448–m–46, between 0.25 and 2.75 grams, preferably between 0.7 and 2.0 grams, per 50 square centimeters per 24 hours at room temperature, said standard method being modified by providing a 100% relative humidity differential and static air conditions, and with the desiccant-containing dishes in an upright position, in order more closely to simulate actual conditions in use.

Herein and in the claims, the term "carcass" will be understood to refer to whole dressed bodies of beef, lamb and veal, as well as to wholesale portions thereof such as sides, quarters, foresaddles and hindsaddles.

The film employed possesses stretch characteristics equal to or greater than that of the absorptive material so that pulling and stretching of the composite product tightly around and over the carcass does not result in separation of the film from the absorptive material. The composite structure is advantageously translucent so that the color of the meat will be visible at least in part, especially when the product is wet.

It will be seen that the product of the invention is characterized by a water-absorptive portion or surface bonded to a relatively non-absorptive but moisture-vapor-permeable portion or surface. In applying the novel meat wrap to the carcass, either the film surface or the absorbent material surface may be placed in contact with the carcass and advantageous results are obtained in both instances. When the maximum wicking action is desired, the absorbent material is placed in contact with the carcass and, on the other hand, when maximum adhesion is sought, the film surface will be applied to the carcass. When lamb carcasses are wrapped, it is often desirable to place the absorbent surface in contact with the carcass because the absorbent layer will tend to absorb the wooly, oily flavor, and thereby improve the marketability of the meat.

In applying the meat wrap to the carcass, the absorbent layer is preferably treated with a solution of sodium chloride having a 5° to 20° salometer reading at 60° F. or other desirable mold spore and bacteria-inhibiting agent. When the meat wrap is applied to a warm, freshly killed carcass, which is generally the case with beef and lamb, and maybe the case with veal, the product is preferably saturated with the solution. On the other hand, if the carcass has been allowed to chill before skinning, for example veal, the wrap is preferably applied in a damp condition after the excess solution has been removed by squeezing, wringing or hydro-extraction. In other words, on cold carcasses, a minimum moisture content is desirable, whereas on carcasses still retaining an appreciable amount of animal heat, a thoroughly wet wrap is preferred. The wrapping is tightly and smoothly applied on the skinned surface of the carcass and fastened thereon by such means as pins, sewed string stitches, string ties, thermoplastic seals or self-binding tapes.

The wrapping described herein overcomes the various disadvantages and limitations inherent in each of the previously proposed wraps and methods and provides a mono-wrap for meat carcasses comprising an insulating blanket of absorbent material having correct moisture absorbency and a film having the correct moisture-vapor permeability so that even distribution of surface chilling and ideal moisture and air barrier control are provided, thus retarding shrink and natural juice losses to improve tenderness and flavor of the meat. The covering, in addition, adheres to the unsolidified natural gelatinous surface of freshly skinned carcass meat. Furthermore, in those instances where the wrap is applied to warm carcasses, the shrinking characteristic of the coating molds the warm carcass into plumpness and desirable conformation during the chilling and setting up process of the meat so that preferred retail meat cuts may be obtained from natively irregular carcasses. This makes for better retail cutting, more shapely cuts, and less waste and trimming.

The comparatively inexpensive wrapping material, a composite of an absorbent material and a moisture-vapor-permeable film, closely approximates the natural skin of the animal in physical characteristics; that is to say, when the product is applied to the carcass, the escape of moisture is retarded sufficiently to prevent loss due to excessive dehydration, and likewise outside air, which very often contains harmful mold spores and bacteria and always dries and darkens meat, is effectively kept out of contact with the meat surface. In usual procedures, the meat shrinks and forces or exudes to the surface a substantial amount of moisture which should be wicked up or wiped off. When the carcass, however, is wrapped in accordance with the invention, evaporation of moisture is materially reduced. Thus, tests have established that, when meat carcasses are wrapped with the products of this invention, the loss in weight of the carcass due to evaporation is substantially lessened as compared to the loss sustained when other wraps are employed. Any moisture that is forced or exuded from the meat wrapped in the product herein described, does not accumulate on the surface and there are no areas of slime or drops of moisture thereon. Thus, when the absorbent material is placed in contact with the carcass, it serves as a wick so that the exuded moisture is absorbed and, on the other hand, when the film is in contact with the carcass, there is little if any passage of moisture through the film and whatever moisture that may pass through is wicked up by the outer surface of absorbent material.

The minute perforations or "pin holes'" present in the film facilitates application of the wrap or covering of the carcass by permitting entrapped air between the wrap and meat surface to escape immediately upon application of the material to the surface of the meat, thus preventing bubbles, and insuring immediate tight adherence. After the application of the wrap, the relative positions of the perforations or "pin holes" to the meat become fixed by adherence of the wrap to the natural soft, pliable, gelatinous, sticky surface of the freshly skinned carcass meat, and air is thereby substantially excluded, because even if a small amount of air should enter, it cannot move laterally beneath the tightly sealed wrapper.

Referring further to the structure of the meat wrap, the absorbent material is preferably a woven fabric and since the weight of the cloth determines the cost thereof, it will be advantageous to use as light and inexpensive a cloth as possible which possesses the desired characteristics. Generally, a fabric of a conventional weave construction weighing between 5 and 9 square yards to the pound, and preferably one weighing between 6 and 8 square yards to the pound, will be employed. It is to be understood, however, that any absorbent material possessing the desired characteristics, including other woven fabrics, as well as knitted, netted, and unwoven fabrics, for example, a felt, web, bat, or paper, may be used, if desired. The absorbent material should be substantially free from size and hence it may be necessary to de-size the material before the organic film is adhered to the absorbent material. The fibres comprising the absorbent material may be cotton, rayon, paper, or other absorbent fibres. The strength of the absorbent material will be adequate, when in combination with the organic film, so that the unitary product can be stretched about the meat carcass. The upper limit of water retention of the absorbent material is not important and is determined by the type of absorbent material employed. Usually, however, the absorbent material employed will not have a water retention in excess of about 120%, preferably not in excess of 100%, based on the bone dry weight of the product, when the material is soaked in water and hydroextracted at a peripheral speed of 3,250 feet per minute for two minutes, the hydroextractor having a diameter of 5 inches.

The film, as stated, comprises a substantially odorless and tasteless film of water-resistant organic material and may be formed from any organic thermoplastic film-forming material which will provide a film of the stated properties. Thus, the film may be formed from natural elastomers; cellulose esters and ethers; or synthetic resinous material. Preferably, the film is formed from synthetic resinous material and in many instances, the use of a polyvinyl type of resin will be found to be particularly advantageous. Examples of such resins are polyethylene, polyvinyl halide (typified by polyvinyl chloride), polyvinyl esters of the lower aliphatic acids (typified by polyvinyl acetate), polyvinylidine halides (typified by polyvinylidine chloride) and the polyvinyl materials exemplified by polyvinyl formal, polyvinyl acetal, and polyvinyl butyral. Of especial advantage for use are the copolymers of polyvinyl chloride and polyvinyl acetate or of polyvinylidine chloride and polyvinyl chloride. Other examples of synthetic resinous materials that are applicable for use are the polyesters of acrylic and methacrylic acid such as methyl methacrylate resin, the film-forming polyamide (nylon type) resins, polyisobutylene (butyl rubber), butadiene acrylonitrile, butadiene-styrene and polyisoprene. Examples of natural elastomers are latex, natural rubber, the hydrochlorinated derivatives thereof, and chlorinated rubber. Examples of the cellulose esters and ethers are cellulose acetate, nitrocellulose, and ethyl cellulose. As is known and as will be seen from the foregoing, the terms "synthetic resinous material" and "synthetic resin" used herein include synthetic elastomers.

The thickness of the organic film adhered to the absorbent material may be of any desired thickness but in most instances it will be in the neighborhood of ½ to 2 mils in thickness.

The organic film may be formed in any desired manner, for example, separately from the absorbent material and thereafter adhered thereto or it may be formed in the presence of the absorbent material. Likewise, the minute perforations or "pin holes" may be placed in the film during its preparation or subsequently.

In one embodiment, the resin, for example a copolymer of 95% polyvinyl chloride and 5% polyvinyl acetate, is applied as a plastisol or organisol in accordance with well-known procedures. For example, the resin may be suspended in a plasticizer with or without a dispersing agent serving as a diluent to form the plastisol or organisol. The resulting mixture may then be ground in a ball mill placed on a carrier and heated to a temperature to cause the resin particles to flow into each other. While the resin is in this flowable condition, it may be transferred to the absorbent material by bringing the material into contact with resin in the flowable condition, preferably under slight pressure. After the film is cooled, the carrier may be removed and the film will be adhered tenaciously to the absorbent material. Instead of applying the plastisol or organisol to the carrier, it may be applied directly to the absorbent material which may then be heated to the temperature where the resin particles flow together to form the film.

In the usual procedure in the production of a film from a plastisol or organisol, a continuous, impermeable film is desired and, therefore, care is taken during the preparation of the plastisol or organisol to remove the air that is present therein prior to the deposition of the suspension of resin. In contrast to this procedure, in forming the film in accordance with the present invention where minute perforations or "pin holes" are desired in the film, the air is not removed, and, in fact, air may be added to the suspension, if desired. Hence, when the film is formed, the film will not be continuous or impermeable as is customary, but will be provided with the minute perforations or "pin holes" necessary to impart to the film the desired moisture-vapor permeability.

In another procedure in forming the film, the film may be cast from a solution of the film-forming material in an organic solvent. The film is advantageously cast on a carrier and is then transferred from the carrier to the absorbent material, either before the solvent is completely evaporated and while the film is adhesive or after the solvent has been evaporated. In the latter case, the adherence to the absorbent material may be brought about by applying a solvent for the organic material of the film to the absorbent material or to the film. Advantageously, however, when the organic material from which the film is formed is thermoplastic, the film is brought into contact with the absorbent material and the assembly is then heated, preferably under pressure, until the film becomes tacky and hence adheres to the absorbent material. When the solvent (if used) has evaporated or when the assembly of film and absorbent material has cooled, the carrier is removed from the film.

In place of using a cast film, a calendered film may be used in which case it may be adhered to the absorbent material by a solvent or, when thermoplastic, by heat, preferably with pressure, by procedures analogous to those described above in connection with the cast film.

In the preparation of the product from the cast or calendered film, as above described, the required minute perforations or "pin holes" may be formed therein during the preparation of the film or during the adherence of the film to the absorbent material, for example, the pressure applied to effect adherence may cause minute breaks in the film at the points of yarn crossings when the absorbent material is a woven material. In any case, when the film is impermeable or does not have the required number of minute perforations or "pin holes" to provide the moisture-vapor permeability desired, the film, either before or after its adherence to the absorbent material may be perforated, for example, by a mechanical or an electronic perforator. As stated above, the film preferably contains minute perforations or "pin holes" to provide a moisture-vapor permeability or moisture-vapor transmission rate between 0.25 and 2.75 grams, advantageously between 0.7 and 2.0 grams, of water vapor per 50 square centimeters per 24 hours at room temperature and 100% relative humidity, when measured by the above-described modified TAPPI method T448–m–46.

In another procedure, the absorbent material may be coated by means of a standard type coating machine where a doctor blade applies the resin in the form of a solution to the absorbent material. In this instance, the doctor blade may be adjusted so that the points of yarn crossings are not covered with the resin, thus providing the minute perforations or "pin holes." On the other hand, if the absorbent material is coated with a continuous coating, the required number of minute perforations or "pin holes" may be provided therein, for example, by a mechanical or electronic perforator.

It is to be understood that, if desired, other materials, for example dyes, pigments, or reducing agents, may be incorporated in the film or in the absorbent material. When a pigment is incorporated in the film, the normal translucency of the product will be destroyed and, hence, the color or appearance of the carcass will not be visible through the product. If desired to render the film pliable during the conditions of use by the product, for example, in the cold at a temperature of 32° F. to 35° F., plasticizers may be incorporated therein as is well known in the art.

The following examples of the meat wrap of the invention are given for illustrative purposes only. In each case, the absorbent material possessed the required water-retention and the moisture-vapor permeability figures given were determined by the aforesaid modified TAPPI method and are given in grams per 50 square centimeters per 24 hours at room temperature and 100% relative humidity.

A. Polyvinyl butyral film, about 2 mils in thickness, was transferred from a temporary backing sheet by heat and pressure to cotton sheeting 44 x 40 having 7 square yards to the pound. The resulting structure had a moisture-vapor permeability of 0.77 and a water-retention of approximately 65% (5.53 grams per square foot).

B. Polyvinyl butyral film, about 2 mils in thickness, was transferred from a temporary backing sheet by heat and pressure to cotton sheeting 50 x 44 having 5.5 square yards to the pound. The resulting structure had a moisture-vapor permeability of 1.25 and a water-retention of approximately 80%.

C. A 1 mil film of polyvinyl chloride-polyvinyl acetate copolymer (95%–5%) was coated, using a doctor blade, on to a woven cotton cloth having a 44 x 40 construction and 7 yards per pound of cotton. The resulting structure had a moisture-vapor permeability of 2.59 and a water-retention of approximately 65%.

D. A 2 mil coating of polyvinyl chloride-polyvinyl acetate copolymer (95%–5%), prepared on a carrier from an organosol suspension, was applied on cotton scrim 44 x 36 having 8.60 square yards to the pound. The resulting structure had a moisture-vapor permeability of 0.54 and a water-retention of approximately 40%.

E. A 2 mil coating of polyvinyl chloride-polyvinyl acetate copolymer (95%–5%) was applied to cotton scrim 44 x 36 having 8.60 square yards to the pound, as outlined in D above. The resulting structure had a moisture-vapor permeability of 0.25 and a water-retention of approximately 40%.

F. A 2 mil coating of polyvinyl butyral was transferred from a temporary backing sheet by heat and pressure to a cotton scrim 54 x 44 having 5.5 square yards to the pound. The resulting product had a moisture-vapor permeability of 1.75 and a water-retention of approximately 80%.

Each of these wrappings are useful for covering freshly killed or chilled beef, lamb, and veal, and cheese, in accordance with the present invention, although wrapping materials A, B, and D, which are of intermediate permeability, proved more satisfactory than the less permeable wrapping E, or the more permeable wrapping F.

Considerable modification is possible in the selection of the organic-film material, in the absorbent material, and in the physical properties thereof, as well as in the method of making the meat and cheese wrap of the invention and of wrapping meat carcasses with the wrap, without departing from the essential features of the invention.

I claim:

1. The method of regulating the distribution and release of moisture from a meat carcass which comprises covering the surface of said carcass with a moist wrap having one relatively absorptive surface and one relatively non-absorptive surface comprising a thin supple sheet of absorbent fibrous material having adhered to one surface thereof a moisture-vapor-permeable, pliable, extensile, substantially odorless and tasteless, water-resistant film formed of organic thermoplastic film-forming material, said wrap having a water retention of at least 30% of water based on the bone dry weight of the product upon soaking and being hydroextracted at a peripheral speed of 3,250 feet per minute for two minutes, the hydroextractor having a diameter of 5 inches, and having a moisture-vapor permeability between 0.25 and 2.75 grams per 50 square centimeters per 24 hours at room temperature and 100% relative humidity, said moisture-vapor-permeability being provided by minute perforations in said film.

2. The method of claim 1 wherein the meat carcass contains an appreciable amount of animal heat and the absorbent material is placed in contact with the surface of the carcass.

3. The method of claim 1 wherein the meat carcass contains an appreciable amount of animal heat and the organic film is placed in contact with the surface of the carcass.

4. The method of claim 1 wherein said wrap has absorbed thereon a mold-inhibitive solution.

5. The method of regulating the distribution and release of moisture from a meat carcass which comprises covering the surface of said carcass with a wrap having one relatively absorptive surface and one relatively non-absorptive surface comprising a thin supple sheet of absorbent fibrous material having adhered to one surface thereof a moisture-vapor-permeable, pliable, extensile, substantially odorless and tasteless, water-resistant film formed of organic thermoplastic film-forming material, said wrap having a moisture-vapor-permeability due to minute perforations in said film of between 0.25 and 2.75 grams per 50 square centimeters per 24 hours at room temperature and 100% relative humidity.

6. The method of claim 5 wherein said sheet of absorbent fibrous material carries a mold-inhibitive solution.

7. The method of claim 5 wherein said organic thermoplastic film-forming material is polyethylene.

8. A meat and cheese wrap having one relatively absorptive surface and one relatively non-absorptive surface comprising a thin supple sheet of absorbent fibrous material having adhered to one surface thereof a moisture-vapor-permeable, pliable, extensile, substantially odorless and tasteless, water-resistant film formed of organic thermoplastic film-forming material, said wrap having a water retention of at least 30% of water based on the bone dry weight of the product upon soaking and being hydroextracted at a peripheral speed of 3,250 feet per minute for two minutes, the hydroextractor having a diameter of 5 inches, and said film containing minute perforations therethrough providing a moisture-vapor-permeability between 0.25 and 2.75 grams per 50 square centimeters per 24 hours at room temperature and 100% relative humidity.

9. The product of claim 8 wherein the film is a synthetic resinous film.

10. The product of claim 8 wherein the water retention is at least 40% and wherein the minute perforations in the film provide a moisture-vapor-permeability between 0.7 and 2.0 grams.

11. The product of claim 8 wherein the absorbent material is woven cloth and the organic film is a synthetic resinous film.

12. A meat and cheese wrap having one relatively absorptive surface and one relatively non-absorptive surface comprising a sheet of absorbent woven cloth having adhered to one surface thereof a moisture-vapor-permeable, extensile, substantially odorless and tasteless, water-resistant vinyl resin film, said wrap having a water retention of at least 30% of water based on the bone dry weight of the product upon soaking and being hydroextracted at a peripheral speed of 3,250 feet per minute for two minutes, the hydroextractor having a diameter of 5 inches, and said film containing minute perforations therethrough providing a moisture-vapor-permeability between 0.25 and 2.75 grams per 50 square centimeters per 24 hours at room temperature and 100% relative humidity.

13. The product of claim 12 wherein the water retention is at least 40% and wherein the minute perforations in the film provide a moisture-vapor-permeability between 0.7 and 2.0 grams.

14. The product of claim 12 wherein the vinyl resin film is polyethylene.

15. A meat and cheese wrap having one relatively absorptive surface and one relatively non-absorptive surface comprising a thin supple sheet of absorbent fibrous material having adhered to one surface thereof a moisture-vapor-permeable, pliable, extensile, substantially odorless and tasteless, water-resistant film formed of organic thermoplastic film-forming material, said wrap having a moisture-vapor-permeability due to minute perforations in said film, of between 0.25 and 2.75 grams per 50 square centimeters per 24 hours at room temperature and 100% relative humidity.

References Cited in the file of this patent

UNITED STATES PATENTS

| | | |
|---|---|---|
| 2,076,053 | Williams et al. | Apr. 6, 1937 |
| 2,106,808 | Murphy et al. | Feb. 1, 1938 |
| 2,135,901 | Lea | Nov. 8, 1938 |
| 2,184,600 | Knup et al. | Dec. 26, 1939 |
| 2,237,277 | Williams et al. | Apr. 1, 1941 |
| 2,314,300 | Williams et al. | Mar. 16, 1943 |
| 2,335,582 | Coffman | Nov. 30, 1943 |
| 2,407,549 | Gurwich | Sept. 10, 1946 |

OTHER REFERENCES

"Vinylite Plastic Sheet and Sheeting," October 19, 1942, published by Plastics Division, Carbide and Carbon Chemicals Corporation, 30 East 42nd Street, New York, New York, pages 1 to 31, inclusive.

"Monsanto Plastics," Bulletin No. 1000-1, April 14, 1944, pages 1 to 10, inclusive.